United States Patent [19]

Mallon et al.

[11] Patent Number: 4,539,917
[45] Date of Patent: Sep. 10, 1985

[54] COMBUSTION HEATER FOR OIL SHALE

[75] Inventors: Richard G. Mallon; Otis R. Walton, both of Livermore; Arthur E. Lewis, Los Altos; Robert L. Braun, Livermore, all of Calif.

[73] Assignee: The United States of America as represented by the United States Department of Energy, Washington, D.C.

[21] Appl. No.: 534,427

[22] Filed: Sep. 21, 1983

[51] Int. Cl.³ .............................................. F23G 5/00
[52] U.S. Cl. ..................................... 110/256; 34/171; 34/174; 34/175; 110/225; 110/229; 110/302; 201/31
[58] Field of Search ............... 110/225, 227, 229, 230, 110/248, 251, 254, 256, 257, 258, 259, 263, 302, 303, 305, 316, 346, 347; 201/31, 34; 208/8 R, 11 R; 34/171, 174, 175

[56] References Cited

U.S. PATENT DOCUMENTS

| | | | |
|---|---|---|---|
| 1,551,965 | 9/1925 | Muller | 34/174 |
| 2,045,319 | 6/1936 | Watrous | 34/174 |
| 3,175,302 | 3/1965 | Retali et al. | 34/174 |
| 3,274,702 | 9/1966 | Kleinberg | 34/171 |
| 3,292,275 | 12/1966 | Franks | 34/174 |
| 3,371,429 | 3/1968 | Miller et al. | 34/171 |
| 3,376,834 | 4/1968 | Thoren | 110/302 |
| 3,559,598 | 2/1971 | McClure | 110/259 |
| 3,785,304 | 1/1974 | Stookey | 110/346 |
| 3,801,469 | 4/1974 | Essenhigh | 201/34 |
| 4,188,184 | 2/1980 | Fornoni | 34/171 |
| 4,199,432 | 4/1980 | Tamm et al. | 201/31 |
| 4,201,141 | 5/1980 | Teodorescu et al. | 110/259 |
| 4,280,415 | 7/1981 | Wirguin et al. | 110/346 |
| 4,336,128 | 6/1982 | Tamm | 201/31 |
| 4,423,557 | 1/1984 | Westelaken | 34/174 |

Primary Examiner—Edward G. Favors
Assistant Examiner—Steven E. Warner
Attorney, Agent, or Firm—Henry P. Sartorio; L. E. Carnahan; Judson R. Hightower

[57] ABSTRACT

A combustion heater for oil shale heats particles of spent oil shale containing unburned char by burning the char. A delayed fall is produced by flowing the shale particles down through a stack of downwardly sloped overlapping baffles alternately extending from opposite sides of a vertical column. The delayed fall and flow reversal occurring in passing from each baffle to the next increase the residence time and increase the contact of the oil shale particles with combustion supporting gas flowed across the column to heat the shale to about 650°-700° C. for use as a process heat source.

8 Claims, 1 Drawing Figure

COMBUSTION HEATER FOR OIL SHALE

BACKGROUND OF THE INVENTION

The United States Government has rights in this invention pursuant to Contract No. W-7405-ENG-48 between the U.S. Department of Energy and the University of California, for the operation of Lawrence Livermore National Laboratory.

The invention relates to method and apparatus for surface retorting of oil shale and, more particularly, to methods and apparatus for combustion of spent shale containing unburned char.

Oil shale contains a solid organic material called kerogen. The rock must be heated to about 900° F. (450° C.) or higher for the kerogen to undergo a thermal decomposition (pyrolysis) to yield liquid shale oil and hydrocarbon gas, leaving behind on the matrix a char composed mostly of carbon.

All processes under consideration for commercial operation require that oil shale be divided or broken so heat can be applied to decompose the kerogen. In surface retorting processes, mined, crushed and sized oil shale is heated in a retort by various methods to produce shale oil and other products. One type of surface process is the hot solid process which utilizes hot solids heated outside of the retort as the heat transfer media. The hot solid is mixed with raw shale in the retort and both oil and gas are driven off and collected. In several hot solid processes, including the Chevron and Lurgi-Ruhrgas processes, residual char on spent (pyrolyzed) shale is burned and the hot burned shale is used as the heat transfer medium. The process heat for retorting is supplied by burning the spent shale in a separate combustion chamber and returning the reheated shale to the retort where it mixes with fresh incoming shale. Conventionally, the recirculation and burning of the spent shale is carried out in a lift pipe combustor, as illustrated in U.S. Pat. No. 4,199,432 to Tamm, et al., issued Apr. 21, 1980 for a fluidized bed retorting process. Alternatively, a separate combustion chamber may be utilized, as illustrated in U.S. Pat. No. 4,336,128 to Tamm, issued June 22, 1982 in which spent shale is recirculated from a fluidized bed retort through a combustion pipe to a separate fluidized bed combustion chamber. These patents are illustrative of the Chevron process in which a solid heat transfer agent is mixed with incoming crushed shale in a fluidized bed. In the Lurgi, process, hot fines are mixed with incoming shale in a mechanical screw feed arrangement. A disadvantage of the Chevron process is the need for gas processing facilities to support the fluidized bed. A disadvantage of the Lurgi method is the requirement for large moving mechanical equipment (the screw mixer) which is capable of withstanding the high retort temperatures.

A lift pipe combustor is difficult to operate because of the size distribution of the shale particles entering the lift pipe. The air velocity for the lift condition is determined by the biggest particles. The smaller particles then move upward almost as fast as the air. Since for a particular operating temperature a certain amount of time is needed to burn the carbon, a very tall pipe is often required, typically over 200 feet. Near the top of the pipe the reaction rate is slower since the oxygen is depleted. Accordingly, a small particle size, typically a few mm, and a narrow particle-sized distribution, typically a variation of about 1-2 mm, is preferred and blower requirements to operate the lift pipe are high. Thus, a lift pipe combustor is generally disadvantageous in terms of reactor size and operational controls as well as the requirement of crushing the shale within the prescribed size range.

It is desirable to raise the temperature of pyrolyzed oil shale to a sufficiently high temperature, typically in the range 650°-700° C., for recycling as a process heat source. The hot burned shale is mixed with raw shale in a pyrolyzer to provide process heat and produce further pyrolysis. It is necessary to bring the burned shale to the desired temperature at a fast rate because carbonate mineral components, e.g., dolomite, start to decompose at about 500° C. by an endothermic process which reduces efficiency. However, the decomposition of the dolomite and other carbonate minerals is minimized if the temperature rise and residence time at temperatures above 500° C. to 700° C. is short enough. For those oil shales without carbonates, it may be desirable to raise the temperature even higher.

Accordingly, it is an object of the invention to provide a combustion heater in which spent shale is heated by burning residual char.

It is also an object of the invention to provide a combustion heater for an oil shale retorting process in which recirculated shale is burned to provide process heat.

It is another object of the invention to raise burned oil shale to a temperature in the range of about 650°-700° C.

It is a further object of the invention to provide sufficient residence time in a combustion heater for combustion to occur.

It is another object of the invention to provide good contact of burned shale with oxygen to burn unburned char in the shale.

It is another object of the invention to provide independent control of the burning by varying the flow of oxygen or air.

It is also an object of the invention to raise retorted burned shale to a high temperature to minimize decomposition of dolomite and other carbonate minerals.

SUMMARY OF THE INVENTION

The invention is a delayed fall combustion heater for providing uniform exposure of oil shale containing some unburned char to air or oxygen for the proper time to burn. The mixture of burned shale and spent shale containing unburned char is introduced into the combustion heater in which the char is burned to raise the mixture to a desired temperature of about 650°-700° C. Approximately 10-20 seconds are required for the burn. The invention comprises a plurality of downwardly sloped overlapping baffles alternately extending from opposite sides of a vertical column to provide a delayed fall of the oil shale mixture to increase residence time and contact with oxygen to burn the unburned char in the oil shale mixture. Air is introduced through orifices on one side of the heater, and air and combustion products exit through discharge ports on the opposite side producing a cross-flow of air or oxygen through the flowing oil shale stream.

BRIEF DESCRIPTION OF THE DRAWINGS

The FIGURE shows a schematic sectional view of the combustion heater.

DETAILED DESCRIPTION OF THE PREFERRED EMBODIMENTS

Figure 1:
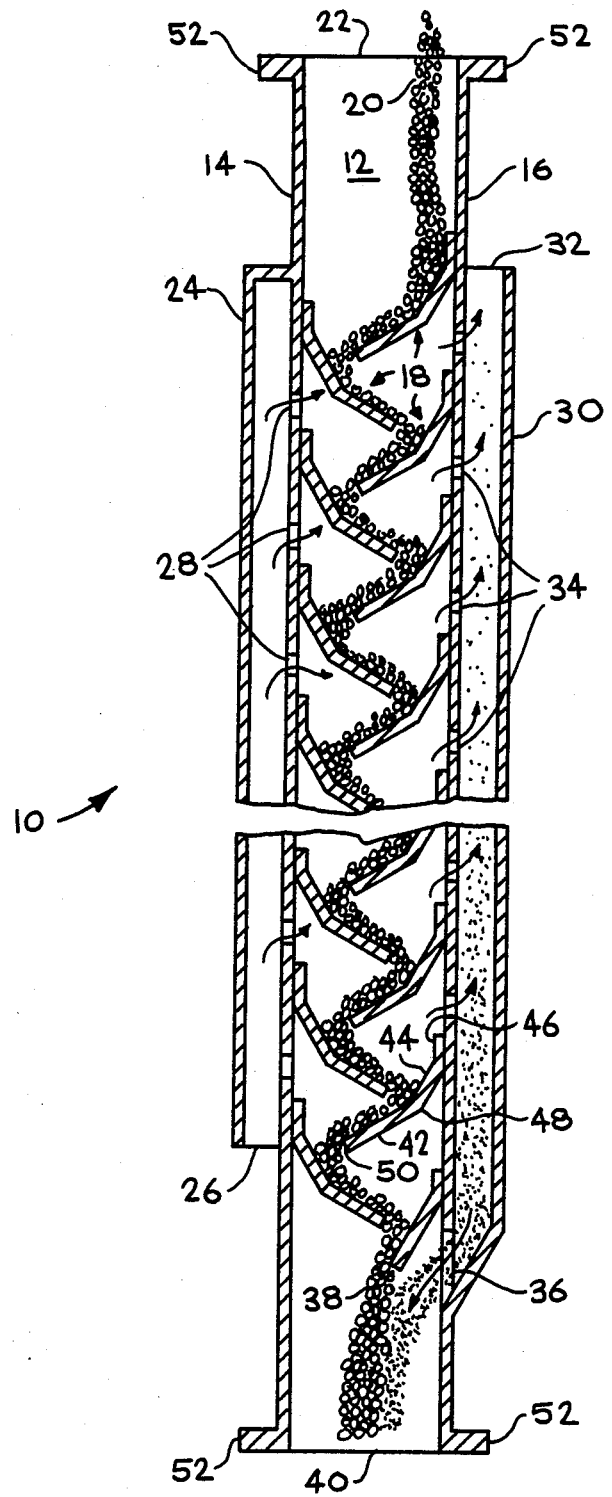

Combustion heater 10, showed schematically in cross-section in the FIGURE, comprises a vertical column or combustion chamber 12 having a pair of parallel lateral walls 14 and 16. A vertical stack of opposed overlapping downwardly sloped baffles or inclined planes 18 are arranged in the vertical combustion chamber 12. The stack of baffles 18 are mounted alternately from lateral walls 14 and 16. The baffles 18 are vertically spaced but extend laterally from the walls 14 and 16 into the vertical combustion chamber 12 in an overlapping relationship. The stream 20 of incoming shale enters the vertical combustion chamber 12 at the top through opening 22. As the shale cascades down the stack of baffles 18 a delayed fall is produced which increases the residence time of the shale for combustion to occur. The stream 20 of incoming shale contains spent shale with unburned char which has generally been at a temperature of about 500° C., e.g., by recirculation from the output of the pyrolyzer section of an oil shale retort. The flowing shale is contained in the vertical combustion chamber 12 for a sufficient time to burn the char to raise the shale temperature to about 650°–700° C. An air plenum or manifold 24 is mounted to the outside of lateral wall 14 and combustion supporting gas, e.g., air or oxygen, is flowed into the plenum 24 through air inlet 26. A plurality of air orifices 28 are formed in the lateral wall 14 so that air flows from the plenum 24 into the vertical combustion chamber 12. A gas discharge plenum or manifold 30 is mounted to the outside of lateral wall 16 and gases are removed through outlet 32. A plurality of gas discharge ports 34 are formed in lateral wall 16 between the combustion chamber 12 and gas discharge plenum 30. Air entering the vertical combustion chamber 12 through orifices 28 from plenum 24 flows across the stream of shale particles cascading down the stack of baffles 18 and flows out through the discharge ports 34 into discharge plenum 30. The oxygen in the air supports combustion of the remaining carbon in the shale to raise the shale temperature. The output shale temperature from the combustion heater 10 is controlled by the rate at which air is passed through the combustion chamber 12. As air and combustion products are removed through discharge ports 34 very small particles or fines may also be carried out into the discharge plenum 30 where they may settle out and fall to the bottom of plenum 30 where they collect and pass through inlet 36 in lateral wall 16 back into the column 12. The discharge shale stream 38, after passing down the stack of baffles 18, falls through the opening 40 at the bottom of vertical chamber 12.

In order to improve or enhance the operation of the combustion heater, it may be desirable or necessary to add fuel to the solid or gas stream, particularly during start up or when the char content in the shale is too low. For example, coal or raw shale may be added to the solid stream or combustible gas may be added to the gas stream.

The cascading combustion heater, according to the invention, utilizes the properties of material flow down an inclined plane to increase the residence time of the shale in the combustor and to increase the contact of the shale particles with oxygen flowing through the combustor to burn the unburned char in the oil shale. In the combustion heater 10 the material flows down a plurality of overlapping baffles or inclined planes 18 alternately extending from opposing sides of a vertical column 12. Size segregation of particles occurs on an inclined plane flow with large particles rising and small particles going to the bottom. With each flow reversal in passing from one inclined plane to a successive opposed incline plane an inversion of the top and bottom layers occurs. As the process is repeated on each successive inclined plane the segregation and mixing that occur provide many opportunities for contact of the cascading shale particles with the oxidizing gas flowing through the combustion chamber.

A test apparatus was constructed which is 4 m high with horizontal dimensions of $8 \times 15$ cm. The combustion heater has about 120 inclined planes. Tests of solid flow in this apparatus at ambient temperature show that the maximum solids flow rate is 11 kilograms per minute which is about three times the rate required for normal pyrolyzer operation. The residence time of shale in the heater is about 26 seconds which is sufficient for the required amount of temperature increase. Combustion tests on this apparatus have shown that it can produce shale hotter than the desired 650° C. with good stability and temperature control. Different arrangements of air inlet and combustion gas outlet have been investigated, ranging from many air inlets and gas outlets at equally spaced locations along the combustion column to a single air inlet at the bottom of the combustor and a single gas outlet at the top of the combustor. It is generally advantageous to have numerous gas inlets and outlets so that the reactant oxygen can be delivered uniformly throughout the combustor and so that the total outlet gas flux at any given outlet is relatively low, thus minimizing elutriation of burned shale fines.

The baffle 18, as illustrated in the FIGURE, is made up of a lower segment 42 extending from an upper segment 44, the upper segment 44 having a greater slope than the lower segment 42. A vertical segment 46 is connected to the upper segment 44 for mounting the baffle 18 to the combustion heater wall. The baffles are stacked in an arrangement so that the lower tip 50 of the baffle is above and off-set from the junction 48 between the lower segment 42 and upper segment 44 of the next lower baffle so that material flowing from one baffle to the next baffle will impact the lower baffle at around the junction 48 and below. The slope of the lower segment 42 is chosen to provide the proper residence time in the cascade heater while providing continuous flow. The slope of the lower segment 42 measured from the horizontal is preferably in the range of about 30°–50°, and can vary from a maximum of about 50°–60° to a minimum of about 24°–30°. The slope of the upper segment 44 is steeper than the slope of the lower segment 42; the upper segment 44 is provided so that material will not hang up on the baffle and interfere with continuous flow. The upper segment 44 may be curved instead of straight. An alternate simpler embodiment of the baffle would utilize only the lower segment 42 and eliminate the upper segment 44.

One use of the combustion heater according to the invention is as a component in the system disclosed in the related patent application, "Process for Oil Shale Retorting Using Gravity Driven Solids Flow and Solid-Solid Heat Exchange" by Arthur E. Lewis, Robert Braun, Richard Mallon and Otis Walton (S-57,342), Ser. No. 534,472, filed herewith, which is herein incorporated by reference. Recirculated spent shale is burned in the combustion heater to raise the temperature to about 650°–700° C. and then mixed with incoming raw shale in a mixer. For certain shales, e.g., shales without carbonates, it may be desirable to raise the temperature above 700° C. The mixture then flows into a pyrolyzer where the mixture resides for a sufficient time for heat to be transferred from the hot burned shale to the raw shale for pyrolysis of the raw shale to occur. In this application, shale particles of a wide size range, e.g., up to about 15–20 mm, can be flowed through the combustion heater. In other applications the combustion heater, according to the invention, could be utilized to heat fine shale particles, e.g., 6 mm or less in size, for use in a fluidized bed pyrolyzer. As illustrated in the FIGURE flanges 52 may be provided at the top and bottom of the combustion heater 10 for connection to other apparatus. In operation, openings 22 and 40 can be adjustable to provide flow control and also allow a sufficient quantity of solids to remain above each opening to achieve a partial gas block to prevent mixing of oxidizing and reducing gases that exist in various parts of the overall system. If necessary, a suitable type of seal, e.g., a rotary valve, can be placed in the openings 22 and 40 to interface with other components.

Changes and modifications in the specifically described embodiments can be carried out without departing from the scope of the invention which is intended to be limited only by the scope of the appended claims.

We claim:
1. A combustion heater, comprising:
   a vertical column having a pair of opposing sides;
   a vertically spaced stack of alternately opposed overlapping downwardly sloped stationary solid baffles mounted in the column, successive baffles extending from opposing sides of the column, to produce a delayed continuous fall of a stream of material containing a combustible component through the column to produce segregation of particles in a layer of material by size as the material flows down one baffle, and an inversion of the layer as flow is reversed in passing to the next baffle, the baffles comprising a first segment having a slope, measured from the horizontal, in the range of about 24°–60° and a second segment joined to and above the first segment, the slope of the second segment being greater than the slope of the first segment, the stack of baffles being arranged so that the lower tip of one baffle is above and slightly offset from the junction between the first and second segments of the next baffle; and
   a plurality of inlet ports and outlet ports in opposing sides of the column and below the baffles to provide a cross-flow of combustion supporting gas through the column to contact material as it falls through the column and support combustion of the combustible component to heat the material, the ports being sufficient to provide combustion supporting gas substantially uniformly through the column and to allow sufficiently low output gas flux at each port to minimize removal of fine burned material.
2. The apparatus of claim 1 wherein the number of baffles is sufficient to increase residence time of the material in the column and increase contact of the combustible component with combustion supporting gas to heat the material to a preselected temperature.
3. The apparatus of claim 1 wherein the material is spent oil shale containing unburned char.
4. The apparatus of claim 1 wherein the second segment is curved in shape.
5. The apparatus of claim 1 further including a gas input plenum mounted to the column and communicating with the column through the inlet ports, and a gas removal plenum mounted to the column and communicating with the column through the outlet ports.
6. The apparatus of claim 1 further including inlet means at the top of the column and outlet means at the bottom of the column.
7. The apparatus of claim 6 further including valve means in the inlet and outlet means to allow material to flow through but prevent gas from flowing back.
8. The apparatus of claim 1 wherein the first segment has a slope in the range of about 30°–50°.

* * * * *